US007864744B2

(12) United States Patent
Song et al.

(10) Patent No.: US 7,864,744 B2
(45) Date of Patent: Jan. 4, 2011

(54) METHOD FOR DYNAMICALLY SELECTING A CHANNEL IN A WIRELESS LOCAL AREA NETWORK

(75) Inventors: Jian Ping Song, Beijing (CN); Junbiao Zhang, Bridgewater, NJ (US); Ming Li, Beijing (CN)

(73) Assignee: Thomson Licensing, Boulogne-Billancourt (FR)

( * ) Notice: Subject to any disclaimer, the term of this patent is extended or adjusted under 35 U.S.C. 154(b) by 1047 days.

(21) Appl. No.: 11/642,203

(22) Filed: Dec. 20, 2006

(65) Prior Publication Data

US 2007/0149230 A1 Jun. 28, 2007

(30) Foreign Application Priority Data

Dec. 27, 2005 (EP) .................................. 05301113

(51) Int. Cl.
*H04W 4/00* (2009.01)
(52) U.S. Cl. ...................... 370/341; 455/166.2; 370/338
(58) Field of Classification Search ................ 455/63.1, 455/114.2, 278.1, 296
See application file for complete search history.

(56) References Cited

U.S. PATENT DOCUMENTS

| 6,738,599 | B2 * | 5/2004 | Black et al. | 455/62 |
| 2004/0156336 | A1 | 8/2004 | McFarland | |
| 2006/0159003 | A1 * | 7/2006 | Nanda et al. | 370/203 |
| 2006/0240947 | A1 * | 10/2006 | Qu | 482/1 |

FOREIGN PATENT DOCUMENTS

| WO | WO02/05490 A2 | 1/2002 |
| WO | WO02/093839 A2 | 11/2002 |
| WO | WO2004/019647 A1 | 3/2004 |

OTHER PUBLICATIONS

R. Durand et. al. "Channel Selection" IEEE 802. 11-05/1066RO (Online) Nov. 3, 2005, p. 1-9, XP002382022 Retrieved from the Internet: URL:ftp://ftp.802wirelessworld.com/11/05/> (retrieved on May 22, 2006) *p. 3, paragraph 7.4.2-p. 5 paragraph 7.4.2.4* p. 7, paragraph 7.4.2.5.-p. 8, paragraph 7.4.2.6*.
Search Report dated May 22, 2006.

* cited by examiner

*Primary Examiner*—Rafael Pérez-Gutiérrez
*Assistant Examiner*—Marcos Batista
(74) *Attorney, Agent, or Firm*—Robert D. Shedd; Jeffrey M. Navon

(57) ABSTRACT

Disclosed is a method of dynamical frequency selecting for a basic service set established by a main wireless device in a wireless local area network. The method comprises steps of a determining step for determining whether a new channel to be used by said BSS is needed; a scanning step conducted by said main wireless device for scanning all channels based on a random priority to detect whether other adjacent BSSs are existing and performing DFS concurrently; a measuring step conducted by said main wireless device based on the scanning result for existing operational BSSs for measuring channel quality of a plurality of channels; selecting one channel based on the channel quality parameters. The present invention advantageously provides a dynamic frequency selection method without any modification for the IEEE 802.11 standard, or any requirement for the implementation of the wireless stations.

10 Claims, 9 Drawing Sheets

| Name | Type | Valid range | Description |
|---|---|---|---|
| BSSType | Enumeration | INFRASTRUCTURE, INDEPENDENT, ANY_BSS | Determines whether Infrastructure BSS, Independent BSS, or both, are included in the scan |
| BSSID | MACAddress | Any valid individual or broadcast MAC address | Identifies a specific or broadcast BSSID |
| SSID | Octet string | 0-32 octets | Specifies the desired SSID or the broadcast SSID |
| ScanType | Enumeration | ACTIVE, PASSIVE | Indicates either active or passive scanning |
| ProbeDelay | Integer | N/A | Delay(in $\mu$ ) to be used prior to transmitting a Probe frame during active scanning |
| ChannelList | Ordered set of integers | Each channel will be selected from the valid channel range for the appropriate PHY and carrier set. | Specifies a list of channels that are examined when scanning for a BSS |
| MinChannelTime | Integer | $\geq$ ProbeDelay | The minimum time(in TU) to spend on each channel when scanning |
| MaxChannelTime | Integer | $\geq$ MinChannelTime | The maximum time (in TU) to spend on each channel when scanning |

Fig. 6

| Name | Type | Valid range | Description |
|---|---|---|---|
| BSSDescriptionSet | Set of BSSDescriptions | N/A | The BSSDescriptionSet is returned to indicate the results of the scan request. It is a set containing zero or more instances of a BSSDescription. |
| ResultCode | Enumeration | SUCCESS, INVALID_ PARAMETERS | Indicates the result of the MLME_SCAN.confirm |

Fig. 7

| Name | Type | Valid range | Description |
| --- | --- | --- | --- |
| BSSID | MACAddress | N/A | The BSSID of the found BSS |
| SSID | Octet string | 1-32 octets | The SSID of the found BSS |
| BSSType | Enumeration | INFRASTRUCTURE,INDEPENDENT | The type of the found BSS |
| Beacon Period | Integer | N/A | The Beacon period of the found BSS(in TU) |
| DTIM Period | Integer | As defined in frame format | The DTIM period of the BSS (in beacon periods) |
| Timestamp | Integer | N/A | The timestamp of the received frame(probe response/beacon) from the found BSS |
| Local Time | Integer | N/A | The value of the STA's TSF timer at the start of reception of the first octet of the timestamp field of the received frame(probe response or beacon) from the found BSS |
| PHY parameter set | As defined in frame format | As defined in frame format | The parameter set relevant to the PHY |
| CF parameter set | As defined in frame format | As defined in frame format | The parameter set for the CF periods, if found BSS supports CF mode |
| IBSS parameter set | As defined in frame format | As defined in frame format | The parameter set for the IBSS, if found BSS is an IBSS |
| CapabilityInformation | As defined in frame format | As defined in frame format | The advertised capabilities of the BSS |
| BSSBasicRateSet | Set of integers | 2-127 inclusive(for each integer in the set) | The set of data rates(in units of 500kb/s) that must be supported by all STAs that desire to join this BSS. The STAs must be able to receive at each of the data rates listed in the set. |

Fig. 8

METHOD FOR DYNAMICALLY SELECTING A CHANNEL IN A WIRELESS LOCAL AREA NETWORK

This application claims the benefit, under 35 U.S.C. §119 of European Patent Application 05301113.6 filed Dec. 27, 2005.

FIELD OF THE INVENTION

The present invention relates to wireless communication, and more particularly to a method for dynamically selecting a communication channel for a basic service set (BSS) in a wireless local area network (WLAN).

BACKGROUND OF THE INVENTION

The proliferation of laptops and hand-held portable computers has produced a concomitant need for robust, reliable and high performance wireless network to maximize the mobility advantages of these wireless devices and increase the ease of construction and management of the wireless networks.

The IEEE 802.11 standard specifies the media access control (MAC) and physical (PHY) layers for wireless local area networks (WLANs). Generally, there are two variants of WLANs: the infrastructure-based type and the ad-hoc type wireless network. In the infrastructure-based network, the communication typically takes place only between the wireless nodes called stations (STAs) and an access point (AP), thus the wireless nodes (STAs) can exchange data via the access point (AP). In the ad-hoc type network, the communication takes place directly between the wireless nodes (STAS) unlike the way of the former network.

The wireless nodes (STAS) within the same radio coverage are known as a basic service set (BSS) which may be established and identified by a main wireless device as a centralized decision maker. For example, in the infrastructure-based network an access point (AP) will establish a BSS according to the IEEE 802.11 standard, while in an ad-hoc type wireless network, a station identifying the BSS will take a role as the centralized decision maker for other stations joining the BSS.

When two adjacent BSSs are located close to each other and operate at the same or adjacent channel, which are referred to as overlapping BSSs, it is difficult to support the required quality-of-service (QoS) due to the possible mutual interference between the overlapping BSSs. In addition, other co-located systems near a particular access point may cause communication interference. It is not always possible to avoid interference by carefully planning channel allocations to BSSs before the WLAN deployment, especially in the home/office environment where other WLAN devices are operating independently in the vicinity.

Some dynamic frequency selection (DFS) schemes are known to be able to solve the problem and incorporate with IEEE 802.11 standard. In most of existing DFS schemes, the quality of each available channel is measured first by the stations and then report to the access point. The channel with least interference and best quality will be selected as a new channel for the BSS to switch into. In a known dynamic frequency selection mechanism, the operational channel of the WLAN is selected dynamically according to channel quality parameters of Received Signal Strength Indication (RSSI) and Clear Channel Assessment (CCA) busy periods obtained by the AP during channels measurement. However, since these known DFS schemes all rely on the communication between the stations and the access point, they introduce some changes to the current 802.11 specifications, which may bring to a compatibility problem between wireless devices of different manufacturers.

In addition, the conventional DFS schemes can not handle a case that a plurality of BSSs are automatically selecting channel concurrently, for example, when two APs are powered on simultaneously. The access points that are initiating channel selection concurrently will dirty the detecting result of existing operational BSSs and interfere with the decision of the selection of a new channel. In this case, the APs may select the same channel because they detect the same wireless environment.

Accordingly, there is a need for an improvement of dynamic frequency selection scheme which not only meets IEEE 802.11 standard, but also enables selecting of frequency channels appropriately even when a plurality of access points are automatically selecting channel concurrently.

SUMMARY OF THE INVENTION

The present invention is directed to a dynamical frequency selecting method in a wireless local area network (WLAN), wherein a basic service set (BSS) established by a main wireless device can automatically select channels from a plurality of channels according to the criteria determined by the main wireless device.

According to the present invention, the method of dynamical frequency selecting (DFS) comprises a determining step for determining whether a new channel to be used by said BSS is needed; a scanning step conducted by said main wireless device for scanning all channels based on a random priority to detect whether other adjacent BSSs are existing and performing DFS concurrently and completed only when the priority of said main wireless device is the highest among all detected existing BSSs; a measuring step conducted by said main wireless device for measuring channel quality of a plurality of channels based on the scanning result for existing operational BSSs; and a selecting step for selecting one channel based on the channel quality parameters including a received signal strength indication (RSSI) and clear channel assessment (CCA) busy period.

Advantageously the present invention realizes a dynamic frequency selection without introduce any modification to the IEEE 802.11 standard, or any requirement for the implementation of the wireless stations associated with the access points.

The scanning step of the DFS method in accordance with the present invention comprises sub-steps of switching said main wireless device to a predefined channel; changing an original SSID of said main wireless device into a scanning operation SSID containing a priority identification which is randomly generated; scanning all channels to detect whether other adjacent BSSs existing and performing DFS concurrently; scanning the predefined channels to detect whether other adjacent BSSs existing and performing DFS concurrently; and obtaining a list for existing operational BSSs after completion of the detection. Wherein said scanning operation SSID comprises two parts, a first part identifying the scanning operation status of said main wireless device, and a second part identifying a randomly generated priority of the scanning operation for said main wireless device. The measuring step of the DFS method in accordance with the present invention comprises sub-steps of changing said scanning operation SSID into a measuring operation SSID; and measuring channel quality parameters of a plurality of channels based on the result for existing operational BSSs.

Advantageously, the scanning step is able to detect whether some main wireless devices for relevant BSSs are scanning or measuring channel concurrently and to avoid that more than one main wireless devices selecting channel concurrently, therefore the co-located BSSs can be evenly distributed on different channels with the least interference, even when a plurality of access points are automatically performing DFS concurrently.

BRIEF DESCRIPTION OF DRAWINGS

A more complete understanding of the method in accordance with the present invention may be illustrated by reference to the following detailed description when taken in conjunction with the accompanying drawings, wherein

FIG. 6 illustrates the primitive parameters of MLME-SCAN.request according to the IEEE 802.11 standard;

FIG. 7 illustrates the primitive parameters of MLME-SCAN.confirm according to the IEEE 802.11 standard;

FIG. 8 illustrates the elements of each BSSDescription in the FIG. 7; and

DETAIL DESCRIPTION OF PREFERRED EMBODIMENTS

Figure 1:
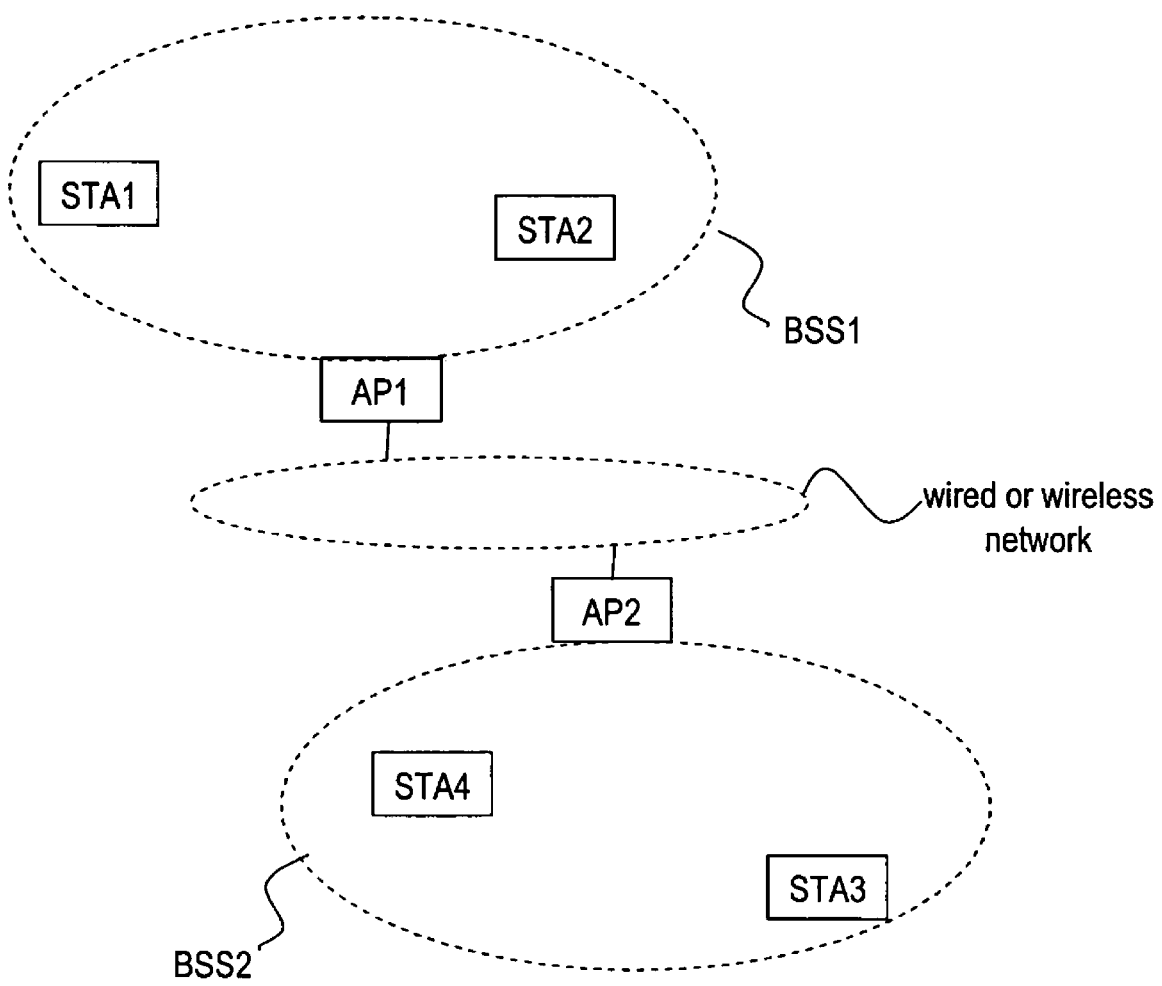
FIG. 1 illustrates the architecture of an infrastructure-based wireless network whereto the method of the present invention is applied.

In accordance with the present invention, a method for dynamically selecting a communication channel in the environment of wireless local area network is provided. With reference to FIG. 1, there illustrates an infrastructure-based type of network whereto the method of the present invention is to be applied. Mobile stations (STAs) and access points (APs) within the same radio coverage area are known as a basic service set (BSS). As shown in FIG. 1, two BSSs are given as an exemplar, a first basic service set $BSS_1$ covers $STA_1$, $STA_2$ and $AP_1$, a second basic service set $BSS_2$ covers $STA_3$, $STA_4$ and $AP_2$. The access points $AP_1$ and $AP_2$ coupled to a wired or wireless network and the $STA_1$, $STA_2$, $STA_3$, $STA_4$ coupled to the respective access points $AP_1$, $AP_2$ through a wireless link are communicating with each other via a plurality of wireless channels. The STAs within a BSS can exchange data with each other via the corresponding AP. The AP is used to direct the traffic, provide access to other networks, support roaming (e.g., changing access points) and synchronization within the BSS, support power management, and control the medium access to support time-bound service within a BSS.

Figure 2:
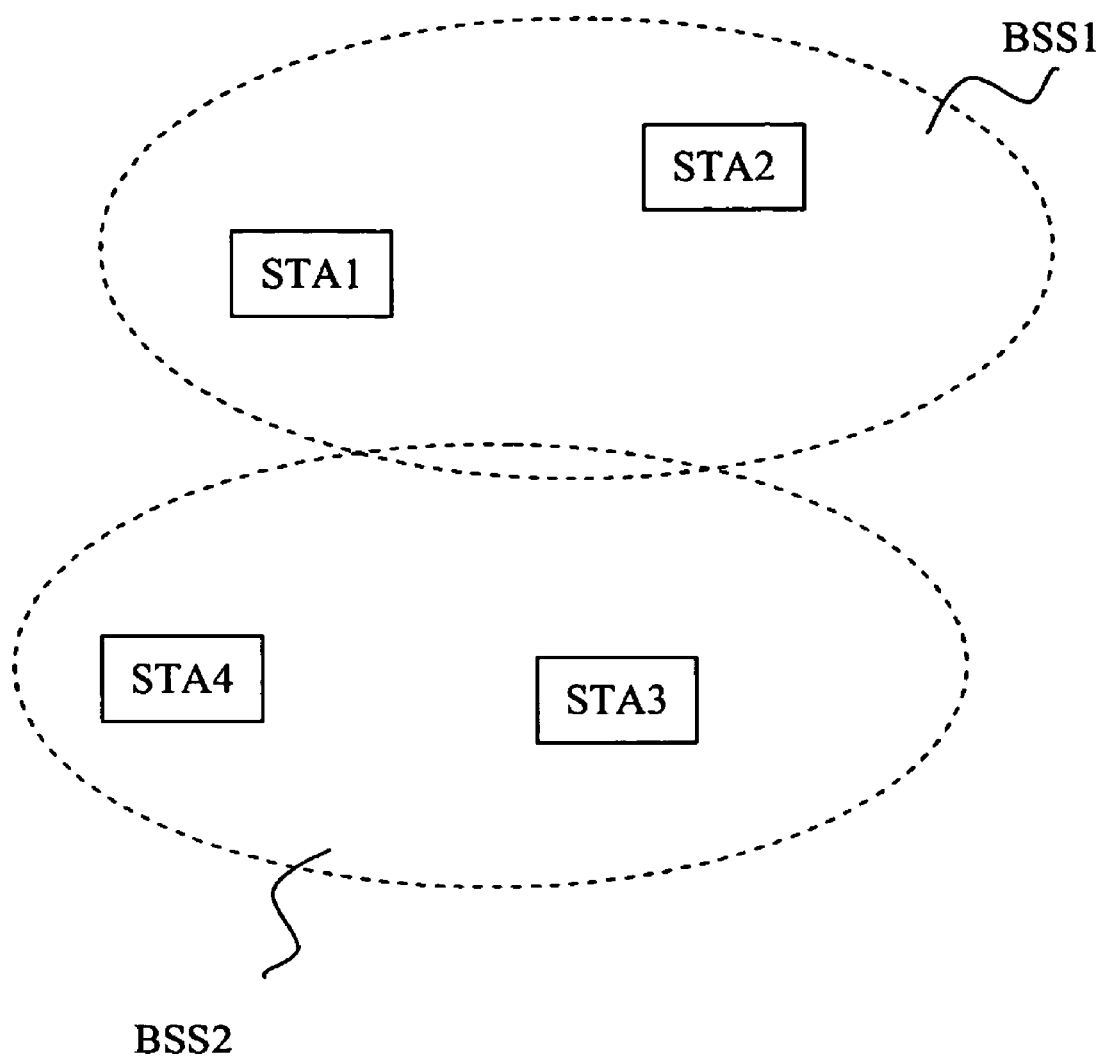
FIG. 2 illustrates the architecture of an ad-hoc type wireless network whereto the method of the present invention is applied.

FIG. 2 illustrates an ad-hoc type of network whereto the method of the present invention is to be applied. A first basic service set $BSS_1'$ covers $STA_1'$ and $STA_2'$. A second basic service set $BSS_2'$ covers $STA_3'$ and $STA_4'$. In $BSS_1'$ or $BSS_2'$, one of STAs which provides centralized decision-maker functionality is served as a main wireless device equivalent to that of an access point in the infrastructure-based wireless network.

It should be appreciated that a preferred embodiment will be described in connection with the infrastructure-based IEEE 802.11 standard, and it is also suitable for use in the ad-hoc type IEEE 802.11 WLAN. However, it should be understood that reference to the IEEE 802.11 standard and its respective terminology is not intended to limited the scope of the present invention. In this regard, the present invention is suitably applicable to a wide variety of other wireless communication systems with utilize a plurality operation frequencies for data transmission. Moreover, it should be noted that the network shown in FIG. 1 or FIG. 2 is small for the purpose of illustration. In practice most networks would include a much large number of mobile STAs and APs.

Now with reference to FIG. 1, the principle of the present invention will be explained in detail by the way of illustration. The inventive dynamical frequency selecting method has application to a wireless local area network (WLAN) by enabling the AP to provide a new wireless link for all stations (STAs) associated with its BSS according to the wireless environment that also reduces the interference to other co-located systems. The $AP_1$ of a $BSS_1$ may be in an overlapping region with a neighboring $BSS_2$, thus experiencing interference from the $AP_2$ of the neighboring $BSS_2$. The present invention can avoid this case by enabling $AP_1$ and/or $AP_2$ to automatically select a new channel.

Figure 3:
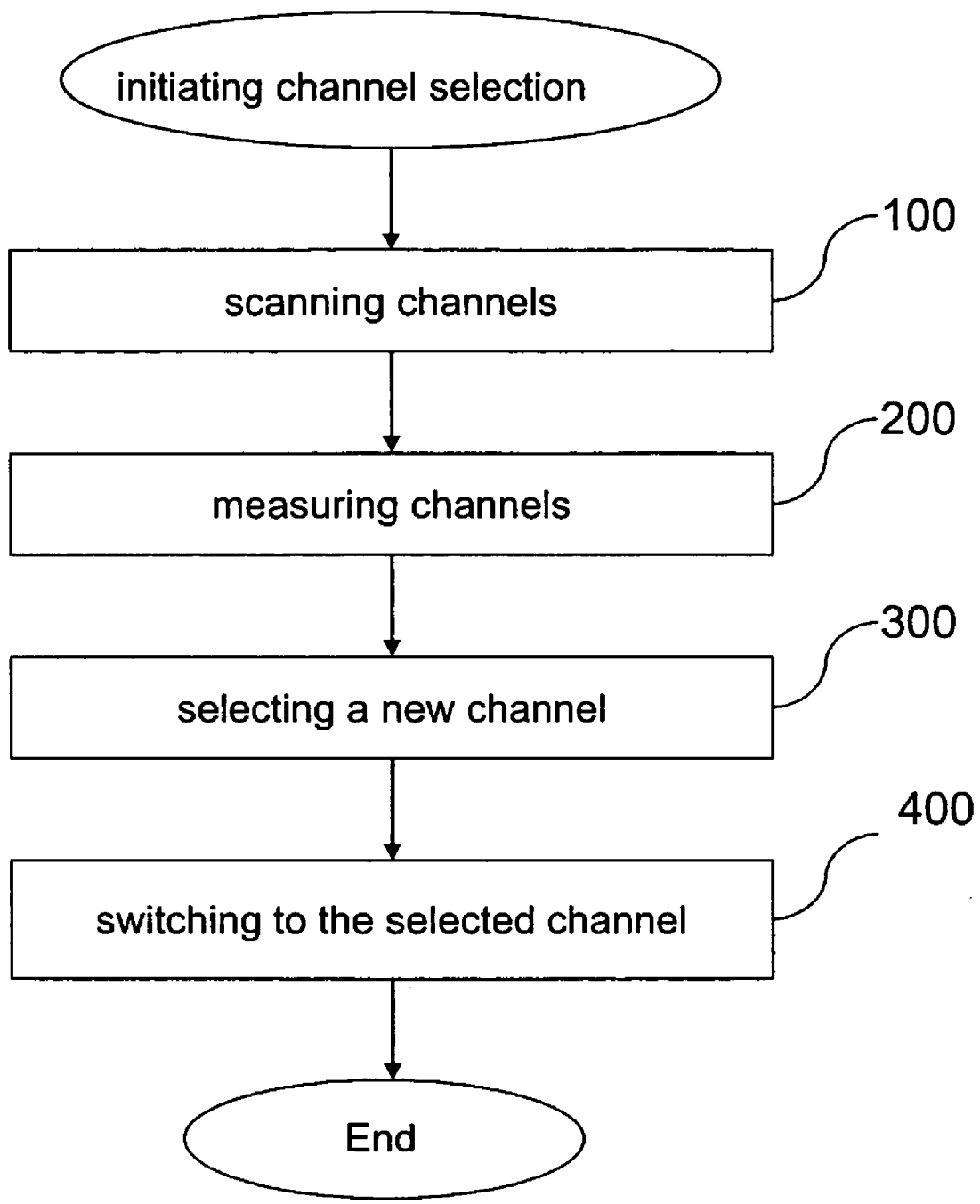
FIG. 3 is a flow chart illustrating the operation steps for the dynamical frequency selecting method in accordance with the present invention.

Referring to FIG. 3, according to the method of the present invention, the dynamical frequency selecting of new channel mainly includes the following steps: scanning channels (step 100); measuring channels (step 200); selecting a new channel (step 300); and switching to the selected new channel (step 400).

First, in initiating of the channel selection, a main wireless device (AP) will determine whether a new channel to be used by its associated BSS is needed. The automatic channel selection can be initiated if some particular events occur. For example, (1) the AP is powered on; (2) administrators manually make the AP to begin automatic channel selection; (3) the overlapping of BSSs occurs causing a channel interference; (4) detecting that other licensed operators cause a channel interference, (5) the AP is configured to automatically select channel periodically, and so on. If any of these events occurs, the AP may automatically select a new wireless link to operate its BSS. Some of these events need AP to know the status of the current wireless environment as well as the presence of other licensed operators. It should be noted that the initialization process is implementation specific and is well-known in the art.

1. Scanning Channels (Step 100 of FIG. 3)

In order to select an optimal channel, the access point needs to detect the status of the wireless environment, for example, the existing operational basic service sets (BSSs). However, in some cases, a plurality of access points (APs) maybe initiate channel selection concurrently. The APs that are initiating channel selection concurrently will dirty the detecting result of existing operational BSSs and interfere with the decision of the selection of a new channel.

For example, with reference to FIG. 1, suppose that $AP_1$ on channel x and $AP_2$ on channel y are automatically selecting channel concurrently. $AP_1$ won't select channel y since it detects a $BSS_2$ for $AP_2$ on channel y. In the same way, $AP_2$ won't select channel x since it detects a $BSS_1$ for $AP_1$ on channel x. As a result, when $AP_1$ and $AP_2$ complete channel selection, channel x and y will be free without any BSSs.

Hence, when one AP is automatically selecting channel, it must know which other APs are also automatically selecting channel and exclude those access points from the existing BSS list.

On the other hand, if more than one APs select channel concurrently, they maybe select the same channel in all probability since they detect the same existing BSS list and using the same channel selection method, which make the selection result to be unoptimizable. For example, suppose that $AP_1$ detects $AP_2$ on channel x and no APs on channel y, so $AP_1$ selects channel y as the new channel. However, $AP_2$ is automatically selecting channel, too, and it also selects channel y as the new channel since it find no APs on channel y. That is, after the channel selection, $AP_1$ and $AP_2$ operate on the same channel and suffer from serious interference with each other.

As a result, there must be a mechanism to detect which access points are selecting channel concurrently and to avoid that more than one access points scanning and obtaining existing operational BSSs concurrently. To achieve this, the present invention implements a special detection process by configuring and using operation SSID corresponding to the original SSID of the AP, which does not lead to any changes to the IEEE 802.11 standard.

In order to detect which access points are automatically selecting channel concurrently, the access point first changes its original SSID to an operation SSID and advertises this operation SSID in the wireless network. By detecting the operation SSID, each access point knows which BSSs are scanning channels or measuring channels. To avoid that more than one access points are measuring channels concurrently, the operation SSID contains the priority information so that only the access point with highest priority can scan and measure channels.

As description above, the operation SSID contains two parts, a first part with a predefined ID that identifies the access point is either in the status of scanning channels or measuring channels, and a second part with a randomly generated priority identification of this access point for scanning of channels. For example, an access point that is scanning channels can use "ScanSSID-832" as its scanning operation SSID, and an access point that is measuring channels can use "MeasureSSID-218" as its measuring operation SSID. Hereinto "ScanSSID-" is the predefined ID that denotes this access point is in scanning operation status, and "MeasureSSID-" is the predefined ID that denotes this access point is in the measuring operation status. The random digital numbers "832" and "218" denote the priorities. It's obvious that the priority is not necessarily limited to digital number.

Since the access point must change its SSID during the channel selection, preferably, the AP should save its original SSID before it begins scanning channels so that it can restore the SSID after completion of the automatic channel selection.

Figure 4:
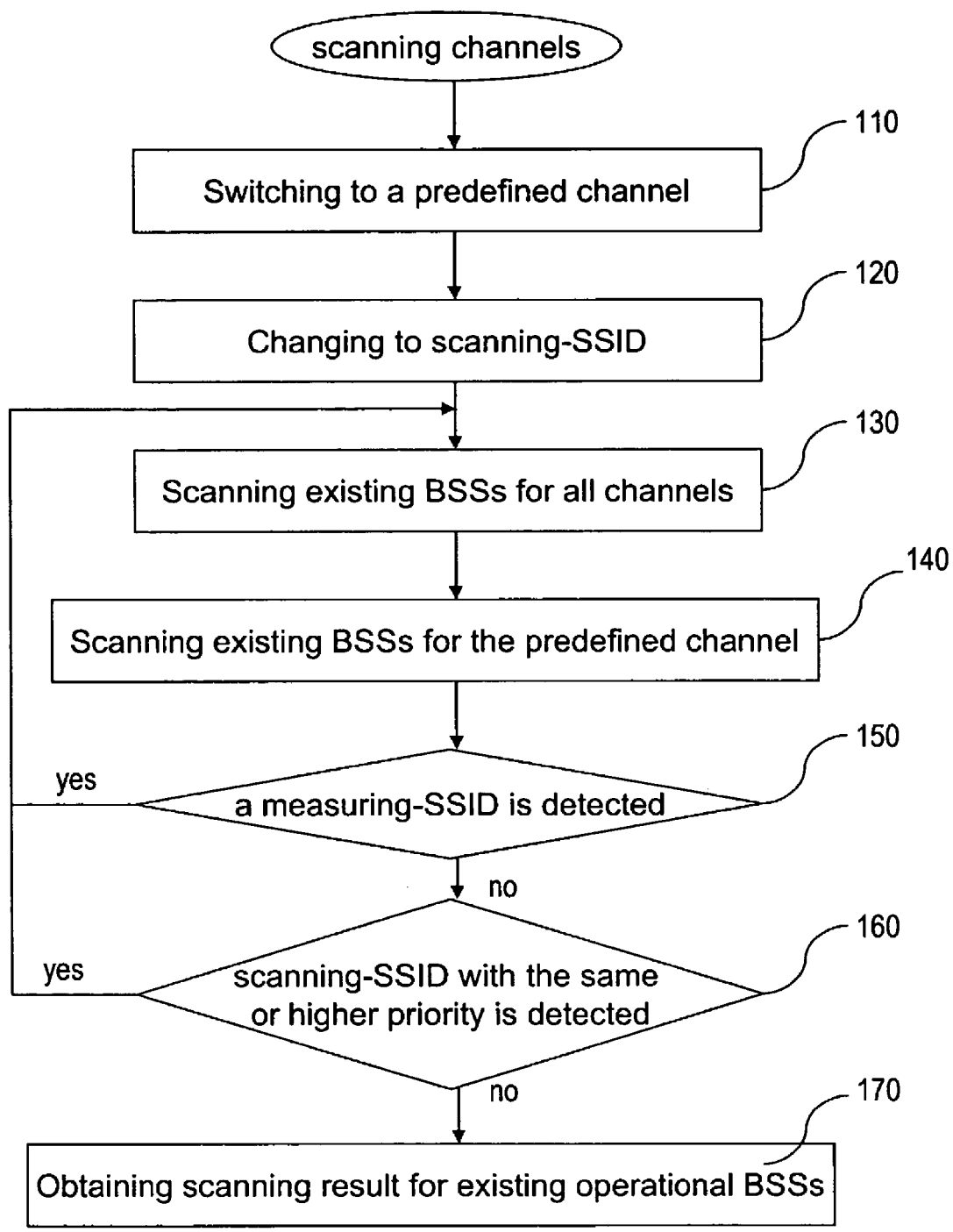
FIG. 4 is a flow chart illustrating the process of scanning channels in accordance with the present invention.

Now referring to FIG. 4, the process of scanning channels of the DFS method in accordance with the present invention includes sub-steps as follows:

1.1 Switching to a Predefined Channel (Step 110 of FIG. 4)

In the scanning channels phase, the access point should detects all existing BSSs and determine whether some other adjacent access points are automatically selecting channels concurrently. In order to assure that all access points implementing channel selection concurrently can be detected, preferably, these access points should switch to a predefined channel before they begin scanning channels. By this way, all access points perform automatic channel selection starting from the same predefined channel so that they can find each other easily.

1.2 Changing to the Scanning-SSID (Step 120 of FIG. 4)

In order to let other adjacent access points know that the AP is scanning channels, the AP should change its original SSID to the so-called scanning operation SSID (i.e., the SSID contains the predefined ID that denotes this access point is scanning with a random priority identification). The scanning operation SSID may be alternatively advertised or not advertised in the wireless network. Therefore, when other access points are scanning channels concurrently, the scanning operation SSID of the AP enables other access point to recognize the scanning operation status of that AP.

1.3 Scanning Existing BSSs for all Channels (Step 130 of FIG. 4)

Figure 5:
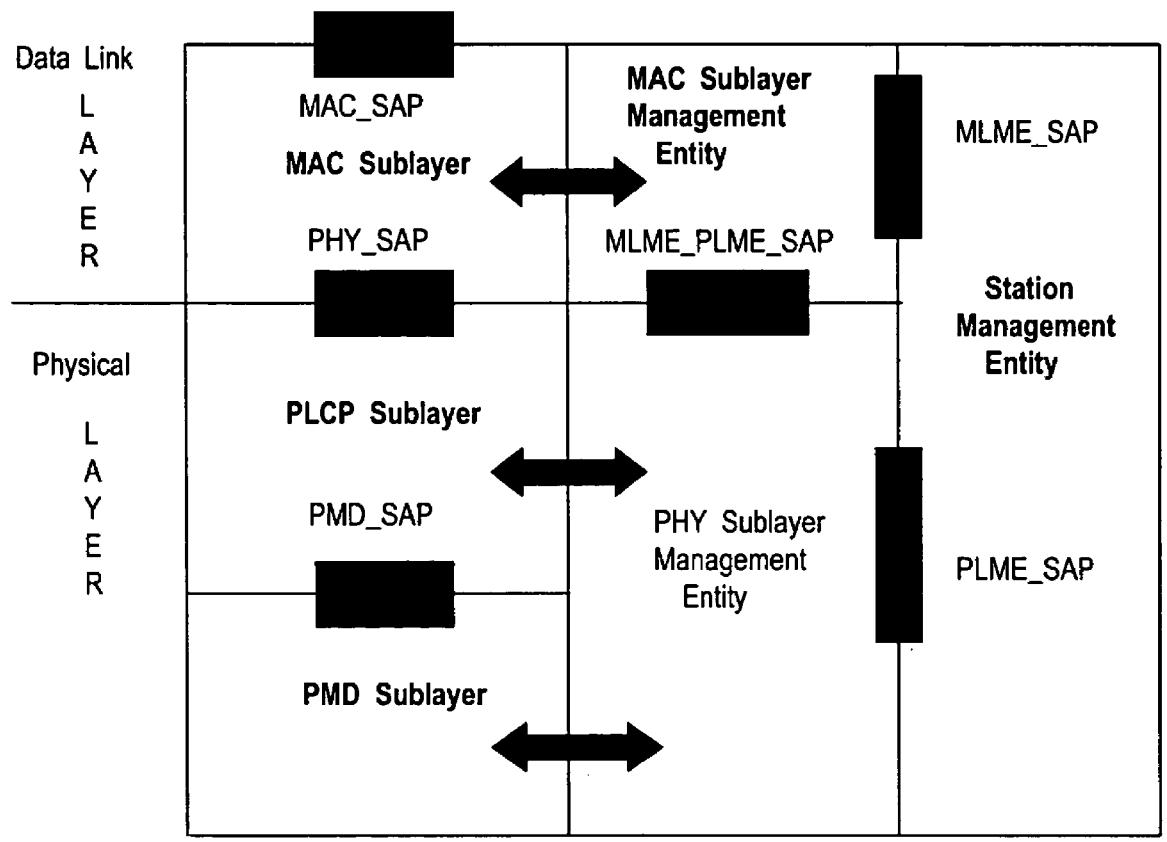
FIG. 5 depicts an architectural view of the medium access control (MAC) of the data link layer and the PHY layer according to the IEEE 802.11 standard.

First the AP will scanning existing BSSs for all channels including the predefined channel. Referring to FIG. 5, for the detection of existing BSSs, it could be performed by using the existing MAC sublayer management entity (MLME) service known as "scan" service and/or its variant. This service is requested by the station management entity (SME) residing within each STA to the MLME via a management primitive "MLME-SCAN.request" in order to request the detection of existing BSSs in a number of channels (Note that an access points is a special station that can provide access to the distribution services via the wireless medium for associated stations).

A number of primitive parameters for MLME-SCAN.request is defined as shown in FIG. 6, including:

BSSType for indicating which type of BSSs to be scanned (here it should be any BSS);

BSSID for indicating which BSSs to be scanned (here it should be the broadcast BSSID);

SSID for indicating which service sets to be scanned (here it should be the broadcast SSID);

ScanType for indicating either active (the STA sends a probe frame and expects a response from a BSS) or passive (the STA simply listens to the channel, trying to detect some frames) scanning;

ProbeDelay for indicating the delay (in μs) to be used prior to transmitting a Probe frame during active scanning;

ChannelList for indicating a list of channels to be examined;

MinChannelTime for indicating the minimum time (in TU) to spend on each channel when scanning; and MaxChannelTime for indicating the maximum time (in TU) to spend on each channel when scanning.

Referring to FIG. 7, the primitive "MLME-SCAN.confirm" is returned by the MLME as the scan results back to the SME, including the complete description of all the BSSs found. The elements of each "BSSDescription" are shown in the FIG. 8.

For example, the $AP_1$ in FIG. 1 will find the adjacent $BSS_2$ in this scanning step if the $AP_2$ for $BSS_2$ is not performing DFS concurrently, but in its normal operation stats.

1.4 Scanning Existing BSSs for the Predefined Channel (Step 140 of FIG. 4)

After finishing scanning existing BSSs for all channel, the AP will scan existing BSSs for the predefined channel once more. It may happen that when $AP_1$ is scanning existing BSSs for all channels, after finishing scanning the predefined channel and begin scanning the next channel, $AP_2$ initiates the automatic channel selection on the predefined channel with a higher priority than that of $AP_1$. So $AP_1$ will not detect $AP_2$ and it begins measuring channel after it scans all the channels. When $AP_2$ scans the predefined channel, it finds that $AP_1$ is scanning channels with a lower priority. However, when $AP_2$ finishes scanning all channels, it doesn't know $AP_1$ has begun measuring channels. So $AP_2$ begins measuring channels, too.

Now $AP_1$ and $AP_2$ are measuring channels concurrently and they probably select the same channel.

In order to avoid the case described above, the access point should scan the predefined channel again when it finishes scanning all channels. Now $AP_1$ will scan the predefined channel again after it finishes scanning all channels and will find $AP_2$ has begun scanning channels with a higher priority. As a result, $AP_1$ won't measure channels until $AP_2$ finishes automatic channel selection.

1.5 Detecting Measuring-SSID (Step 150 of FIG. 4)

When the access point scans channels and finds out a measuring operation SSID for an adjacent BSS, i.e., the SSID contains the predefined ID that denotes that access point for the detected BSS is measuring channels, then it could be known that another access point of the adjacent BSS is measuring channels. So the access point must wait and re-scan channels after the adjacent BSS finishing the DFS.

1.6 Detecting Scanning-SSID (Step 160 of FIG. 4)

When the access point of the BSS scans channels and finds a scanning operation SSID for the adjacent BSS, i.e., the SSID contains the predefined ID that denotes this access point is scanning channels, then if it is determined that the adjacent BSS has the same or higher priority than that of said BSS, the access point must wait and re-scan channels after the adjacent BSS finishing the DFS. If it is determined that no adjacent BSS has the same or higher priority than that of said BSS, then the priority of said BSS is the highest among all the detected BSSs, and it is allowable to complete the scanning firstly.

1.7 Obtaining a Scanning Result for Existing Operation BSSs (Step 170 of FIG. 4)

After finishing scanning all channels through the preceding processes, the access point for said BSS knows all existing neighboring BSSs. However, some of these BSSs may contain the access points that are scanning channels concurrently with a lower priority. The channel information of these BSSs is temporal and will be updated when they finish selecting channels. So, these BSSs scanning channels concurrently in a lower priority must be excluded from result for existing operational BSSs. This existing operational BSSs list is the base for measuring and selecting of frequency.

2. Measuring Channels (Step 200 of FIG. 3)

Figure 9:
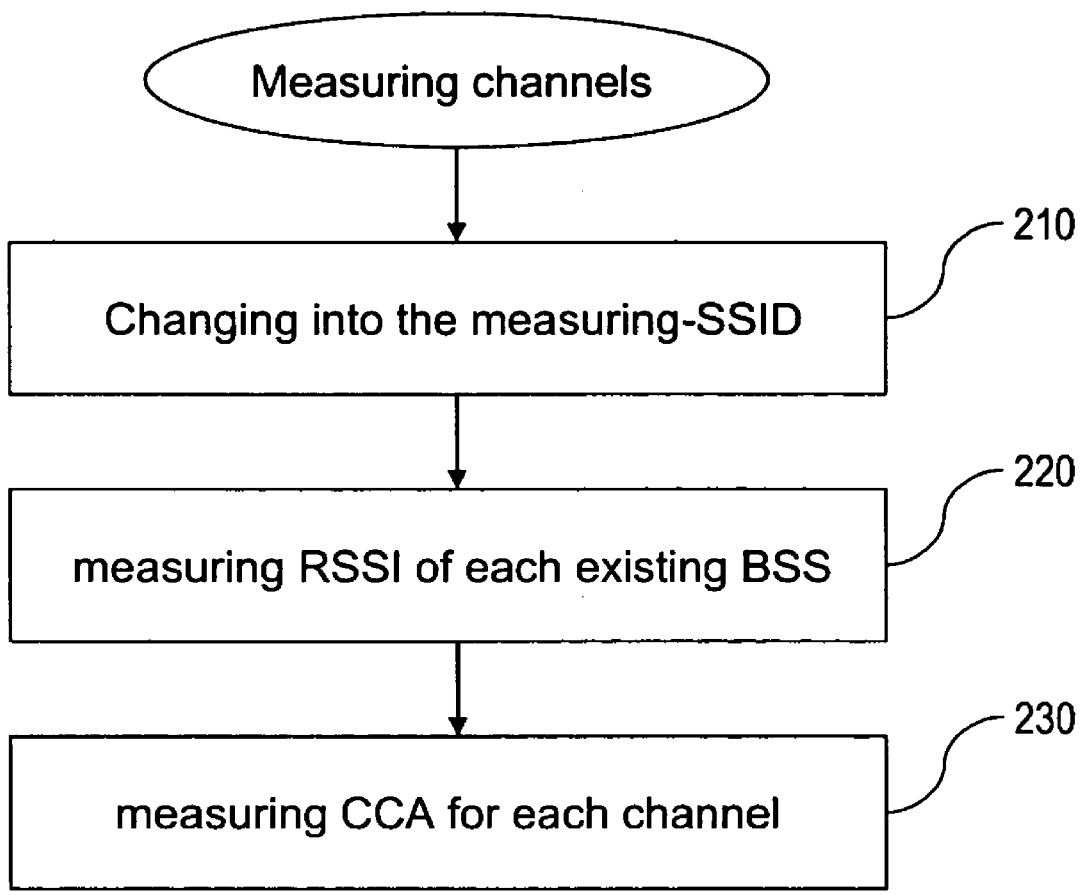
FIG. 9 is a flow chart illustrating the process of measuring channels in accordance with the present invention.

After finishing scanning channels, the access point now obtains the existing operational BSSs list and knows that it can begin measuring channels based on this existing operational BSSs list. With reference to FIG. 9, the process of measuring channels includes the following sub-steps: changing to the measuring operation SSID; measuring received signal strength indication (RSSI) of each existing BSSs; and measuring clear channel assessment (CCA) busy periods.

2.1 Changing to the Measuring Operation SSID (Step 210 of FIG. 9)

When the access point begins measuring channels, it first changes its SSID into measuring operation SSID and advertises it so that other access points can detect it and won't begin scanning channels until the current access point finishes channel selection. Alternatively, the AP may also not advertise its SSID in the network, but just let its SSID being detectable by the other APs for adjacent BSSs. Afterwards the AP performs a further analysis of the channel condition to select a channel. In particular, it is determined how strong the received signal is for each existing BSS and how busy the channel is for each supported channel.

2.2 Measuring RSSI of Each Existing BSSs (Step 220 of FIG. 9)

In the embodiment, we use the strength of the received signal to indicate the interference level for each existing BSSs. The strength of the received signal is measured at step 220. The 802.11 PHYs define a parameter called Received Signal Strength Indicator (RSSI), which rages from 0 through the RSSI maximum. This parameter is measured by the PHY layer and indicates the energy level observed at the antenna that is used to receive the current PLCP Protocol Data Unit (PPDU). The RSSI is measured during the reception of the PLCP preamble.

2.3 Measuring CCA Busy for Each Channel (Step 230 of FIG. 9)

Except for the measurement of interference by other BSSs, the measurement of noise by 802.11 non-compliant devices should also be performed. It's well known that if another device which follows different standards, for example, a Bluetooth standard, is running in the same channel as the AP, the communication between the AP and the associated STAs will be interfered. If there exists an interfering non-802.11 (or alien) device in a channel, the AP will not be able to receive the signals from the device correctly. However, if the signal power from the alien device is higher than a threshold (e.g., PHY MIB dot11EDThreshold for 802.11b or dot11T1Threshold for 802.1a), the channel is indicated as BUSY to the MAC layer via the PHY-CCA.indication (BUSY) parameter under the existing 802.11 PHY layer standard. Hence, a non-802.11 device running in a specific channel can be detected if the AP measures a time period when the channel stays busy, without receiving any meaningful MAC frames (indicated by PHY-RXSTART.indication and PHY-RXEND.indication).

As described above, the CCA busy means that the channel is not available since another device (either 802.11 or non-802.11) is using the channel. Hence, we can use the CCA busy fractional period out of the whole measurement duration to measure the interference level for each supported channels.

3. Selecting a New Channel (Step 300 of FIG. 3)

It's obvious that the AP should select the optimal channel that has least interference from other devices (either 802.11 or non-802.11). For each channels, the RSSI and/or CCA busy fraction can be used to measure the interference level.

We know that two BSSs will interfere with each other if they use the same channel. In fact, since the energy of a channel will spread on adjacent channels, two BSSs on adjacent channels will interfere with each other as well. For example, in direct sequence spread spectrum (DSSS) system (802.11 DSSS PHY), adjacent BSSs using different channels may suffer from interference if the distance between the center frequencies is less than 22 MHz, namely, 5 channels. Hence, for each channel on which any BSSs are detected, the RSSI for adjacent channels are also calculated by the criteria implemented in the AP. It should be noted that the criteria to calculate RSSI of adjacent channels is implementation-dependent. Thus, various modifications readily apparent to those skilled in the art can be used.

After calculating RSSI for each channel, the AP may determine a specific channel with the least interference, not only to other BSSs but to other co-located wireless systems. How to measure the interference level by the RSSI and/or CCA busy fraction is implementation-dependent.

4. Switching to the Selected Channel (Step 400 of FIG. 3)

After the AP has selected a channel that is optimal in the interference from other devices, it will switch to the selected channel by changing the carrier frequency. Finally, the AP should restore its original SSID if it has changed its SSID in step 100 (scanning channels) and step 200 (measuring channels) of FIG. 3.

As it is apparent from the foregoing, the present invention has an advantage that many co-located access points may knows each other and intelligently select the optimal channels even when they initiate automatic channel selection concurrently. In addition, the present invention does not require any modification for the IEEE 802.11 standard and the implementation of wireless stations.

Having thus described a preferred embodiment of an automatic channel selection method for determining a channel for use within a WLAN system, it should be apparent to those skilled in the art that certain advantages of the system have been achieved. The foregoing is to be constructed as only being an illustrative embodiment of this invention. Persons skilled in the art can easily conceive of alternative arrangements providing functionality similar to this embodiment without any deviation from the fundamental principles or the scope of this invention.

The invention claimed is:

1. A method of dynamical frequency selecting (DFS) for a basic service set (BSS) established by a main wireless device in a wireless local area network (WLAN), the method comprising steps of:
    scanning all channels by said main wireless device based on a random priority to detect whether other adjacent BSSs are existing and performing DFS concurrently so as to obtain a result for existing operational BSSs, and completed only when the priority of said main wireless device is the highest among all detected existing BSSs;
    measuring channel quality of plurality of channels by said main wireless device based on the result for existing operational BSSs after completion of the scanning step;
    selecting one channel based on the channel quality parameters.

2. The method as claimed in claim 1, wherein the method further comprises a step of switching said BSS to the selected new channel.

3. The method as claimed in claim 1, wherein a step of determining that a new channel to be used is needed if one of the following conditions occurs: said main wireless device is powered on; said main wireless device is manually initiated by an administrator to start DFS; said main wireless device overlaps with other adjacent BSSs causing a channel interference; and other licensed operators are detected within said BSS causing a channel interference.

4. The method as claimed in claim 1, wherein the scanning step comprises sub-steps of:
    switching said main wireless device to a predefined channel;
    changing an original SSID of said main wireless device into a scanning operation SSID containing a priority identification which is randomly generated;
    scanning all channels to detect whether other adjacent BSSs existing and performing DFS concurrently;
    scanning the predefined channels to detect whether other adjacent BSSs existing and performing DFS concurrently; and
    obtaining a list for existing operational BSSs after completion of the detection.

5. The method as claimed in claim 4, wherein the scanning step may further comprise step of:
    rescanning all channels and the predefined channel after the detected other adjacent BSSs complete DFS when the other main wireless devices is determined measuring channels or scanning channels in higher priority than that of said main wireless device.

6. The method as claimed in claim 4, wherein the scanning step may further comprises steps of:
    reconfiguring the SSID for said main wireless device so as to generate a new scanning operation SSID containing a new random priority identification when any one of other main wireless devices for the detected other adjacent BSSs is determined scanning channels in a same priority;
    rescanning all channels and the predefined channel to detect whether other adjacent BSSs existing and performing DFS concurrently when the reconfigured scanning operation SSID for said main wireless device is in the highest priority among all the detected BSSs.

7. The method as claimed in claim 4, wherein the existing operational BSSs list excludes the adjacent BSSs scanning in a lower priority than that of said BSS.

8. The method as claimed in claim 4, wherein said scanning operation SSID comprises two parts, a first part identifying the scanning operation status of said main wireless device, and a second part identifying a randomly generated priority of the scanning operation for said main wireless device.

9. The method as claimed in claim 1, wherein a measuring step comprises sub-steps of: changing said scanning operation SSID into a measuring operation SSID; and measuring channel quality parameters of a plurality of channels based on the result for existing operational BSSs.

10. The method as claimed in claim 9, wherein said measuring operation SSID comprises at least one part identifying the measuring operation status of said main wireless device.

* * * * *